(12) United States Patent
Discekici et al.

(10) Patent No.: US 12,227,662 B2
(45) Date of Patent: Feb. 18, 2025

(54) MULTI-FLUID KITS FOR THREE-DIMENSIONAL PRINTING

(71) Applicant: Hewlett-Packard Development Company, L.P., Spring, TX (US)

(72) Inventors: Emre Hiro Discekici, San Diego, CA (US); Thomas M. Sabo, San Diego, CA (US); Stephen G. Rudisill, San Diego, CA (US); Dennis J. Schissler, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 320 days.

(21) Appl. No.: 17/633,988

(22) PCT Filed: Oct. 11, 2019

(86) PCT No.: PCT/US2019/055874
§ 371 (c)(1),
(2) Date: Feb. 9, 2022

(87) PCT Pub. No.: WO2021/071514
PCT Pub. Date: Apr. 15, 2021

(65) Prior Publication Data
US 2022/0325121 A1    Oct. 13, 2022

(51) Int. Cl.
*C09D 11/54*     (2014.01)
*B29C 64/165*    (2017.01)
(Continued)

(52) U.S. Cl.
CPC ............ *C09D 11/54* (2013.01); *B29C 64/165* (2017.08); *B33Y 10/00* (2014.12); *B33Y 70/00* (2014.12); *B29K 2105/0032* (2013.01)

(58) Field of Classification Search
CPC ....... C09D 11/54; B29C 64/165; B33Y 10/00; B33Y 70/00; B33Y 70/10; B29K 2105/0032
See application file for complete search history.

(56) References Cited

U.S. PATENT DOCUMENTS

| 5,204,055 A | 4/1993 | Sachs et al. |
| 5,885,337 A | 3/1999 | Nohr et al. |

(Continued)

FOREIGN PATENT DOCUMENTS

| WO | WO-2007114895 A2 | 10/2007 |
| WO | WO-2018005501 A1 | 1/2018 |

(Continued)

OTHER PUBLICATIONS

Faraday, "The Bakerian Lecture-Experimental Relations of Gold to Light", Pub Jan 1, 1857.

(Continued)

*Primary Examiner* — Jeffrey M Wollschlager
(74) *Attorney, Agent, or Firm* — HP Inc. Patent Department

(57) ABSTRACT

A multi-fluid kit for three-dimensional printing can include a fusing agent and a coloring agent. The fusing agent can include an electromagnetic radiation absorber in a first liquid vehicle. The electromagnetic radiation absorber can absorb radiation energy and can convert the radiation energy to heat. The coloring agent can include a magenta rhodamine dye and a fluorescence quenching iodide salt in a second liquid vehicle. A molar ratio of the magenta rhodamine dye to the fluorescence quenching iodide salt can range from about 1:1 to about 1:10.

14 Claims, 2 Drawing Sheets

(51) Int. Cl.
  *B29K 105/00*  (2006.01)
  *B33Y 10/00*  (2015.01)
  *B33Y 70/00*  (2020.01)

(56) References Cited

U.S. PATENT DOCUMENTS

| | | | |
|---|---|---|---|
| 5,919,291 A | 7/1999 | Hotomi et al. | |
| 6,322,619 B1 * | 11/2001 | Lesani | C09D 11/38 106/31.86 |
| 6,328,792 B1 * | 12/2001 | Mayo | C09D 11/38 106/31.75 |
| 7,972,426 B2 | 7/2011 | Hinch et al. | |
| 8,651,390 B2 | 2/2014 | Hinch et al. | |
| 9,643,359 B2 | 5/2017 | Baumann et al. | |
| 2007/0238056 A1 | 10/2007 | Baumann et al. | |
| 2008/0152810 A1 | 6/2008 | Nohr et al. | |
| 2018/0015664 A1 | 1/2018 | Kabalnov et al. | |
| 2018/0272602 A1 * | 9/2018 | Rudisill | B29C 64/112 |

FOREIGN PATENT DOCUMENTS

| | | | |
|---|---|---|---|
| WO | WO2018080631 | * | 5/2018 |
| WO | WO2018106237 | * | 6/2018 |
| WO | WO-2019182627 A1 | | 9/2019 |

OTHER PUBLICATIONS

Garcia et al, "Dynamically Modulating the Surface", pubs.acs.org/Nano Letter, 2011, pp. 4415-4420.

Gross et al, "Evaluation of 3D Printing and It's Potential Impact on . . . ", Anal. Chem, 2014, pp. 3240-3253.

Kanehara et al, "Indium Tin Oxide Nano Particles with Compositionally Tunable Surface . . . ", J of Amer Chem Soc., 2009, pp. 17736-17737.

Milligan et al, "Morphology of Colloidal Gold—A Comparative Study", Mar. 2, 1964.

Usui et al, "Optical Transmittance of Indium Tin Oxide Nano Particles . . . " J Phys Chem B, 2006, pp. 12890-12895.

Van der Zande et al, "Aqueous Gold Sols of Rod-Shaped Particles", J Phys Chem B, 1997, pp. 852-854.

Weiser et al, "Von Weimans Precipitation Theory and the Formation of Colloidal Gold", pp. 1950-1959.

* cited by examiner

MULTI-FLUID KITS FOR THREE-DIMENSIONAL PRINTING

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques are considered additive processes because they involve the application of successive layers of material. This is unlike other machining processes, which often rely upon the removal of material to create the final part. Some three-dimensional printing methods use chemical binders or adhesives to bind build materials together. For some materials, partial melting may be accomplished using heat-assisted extrusion, and for some other materials curing or fusing may be accomplished using, for example, ultra-violet light or infrared light.

DETAILED DESCRIPTION

Figure 1:
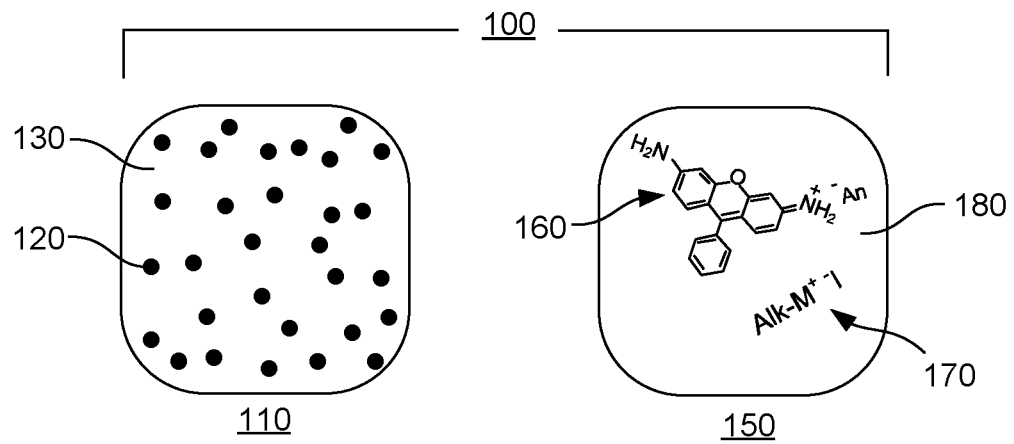
FIG. 1 illustrates an example multi-fluid kit for three-dimensional printing in accordance with the present disclosure.

The present disclosure is drawn to multi-fluid kits for three-dimensional (3D) printing, three-dimensional printing kits, and method of three-dimensional printing. More particularly, the kits can be used for additive manufacturing processes where polymeric powder bed material can be spread on a powder bed on a layer by layer basis. The various layers can be selectively contacted with fluid agents which can include a low tint fusing agent and a coloring agent. The layer of polymeric powder bed material having the electromagnetic radiation absorber applied thereto, as well as other portions of the polymeric powder build material, can be exposed to electromagnetic radiation, but due to the presence of the electromagnetic radiation absorber in some portions, the absorbed light energy at these portions can be converted to thermal energy, causing the polymeric powder bed material to melt or coalesce, while portions of the polymeric powder bed material without the electromagnetic radiation absorber do not melt or coalesce.

In accordance with this, it is noted that there can be challenges printing certain colors when forming a three-dimensional printed article. For example, when printing with magenta dye, in order to promote a uniform coloration under a wide variety of lighting conditions, e.g., natural lighting, LED lighting, fluorescent lighting, UV lighting, etc., sometimes multiple magenta dyes have been used, particularly in color printing on paper-type media. However, in the context of three-dimensional printing using polymeric build material, where a combination of heat, electromagnetic energy, and radiation absorbers are used to melt or coalesce a polymeric part, variability of temperature from layer to layer during the build can occur and continue throughout the build process, e.g., upper layers may be heated differently than earlier layers due to changing thermal properties of the system as a whole, the additive nature of applying materials onto already heated materials, etc. With varying temperatures, when multiple dyes are used, one magenta dye may migrate or be otherwise effected by these different temperature conditions differently than the other magenta dye. This can occur because two different magenta dyes may have two different diffusion rates, which can be impacted by temperature. This variability of migration of dyes can cause color shifting that is apparent at different locations in the printed article.

In accordance with the present disclosure, a multi-fluid kit, a three-dimensional printing kit, and a method of method of three-dimensional printing can include the use of a coloring agent with a rhodamine dye along with a fluorescence quenching iodide salt to provide good uniformity across multiple lighting conditions. Furthermore, in some examples, by using only a single dye, namely the rhodamine dye, as there is only a single dye present, different migration properties due to diffusion rates can be avoided, providing an evenly colored printed article, regardless of the variability of temperature that can occur during the build of a three-dimensional object.

In accordance with this, the present disclosure is drawn to a multi-fluid kit for three-dimensional printing, including a low tint fusing agent and a coloring agent. The low tint fusing agent can include a liquid vehicle and an electromagnetic radiation absorber. The electromagnetic radiation absorber can absorb radiation energy and can convert the radiation energy to heat. The coloring agent can include a magenta rhodamine dye and a fluorescence quenching iodide salt in a second liquid vehicle. A molar ratio of the magenta rhodamine dye to the fluorescence quenching iodide salt can range from about 1:1 to about 1:10. In one example, the electromagnetic radiation absorber can absorb the radiation energy at a wavelength from about 800 nm to about 4,000 nm and the electromagnetic radiation absorber can be transparent or white at wavelengths ranging from about 400 nm to about 780 nm. In another example, the electromagnetic radiation absorber can include an inorganic pigment selected from lanthanum hexaborides, tungsten bronzes, indium tin oxides, aluminum zinc oxides, ruthenium oxides, silver, gold, platinum, iron pyroxenes, iron phosphates, copper pyrophosphates, or a combination thereof. In a further example, the coloring agent includes a colorant consisting of the rhodamine dye. In another example, the fluorescence quenching iodide salt can be selected from lithium iodide, potassium iodide, sodium iodide, or a combination thereof. In another example, a molar ratio of the magenta rhodamine dye to the fluorescence quenching iodide salt can range from about 2:3 to about 1:5. In yet another example, the multi-fluid kit can further include a core fusing agent separate from the low tint fusing agent. The core fusing agent can include a second liquid vehicle and a carbon black pigment electromagnetic radiation absorber. In a further example, the multi-fluid kit can further include a detailing compound.

In another example, a three-dimensional printing kit can include a polymeric powder bed material and a multi-fluid kit. The multi-fluid kit can include a low tint fusing agent and a coloring agent. The low tint fusing agent can an electromagnetic radiation absorber in a first liquid vehicle. The electromagnetic radiation absorber can absorb radiation energy and can convert the radiation energy to heat. The coloring agent can include a magenta rhodamine dye and a fluorescence quenching iodide salt in a second liquid vehicle. A molar ratio of the magenta rhodamine dye to the fluorescence quenching iodide salt can range from about 1:1 to about 1:10. In an example, the polymeric powder bed material can include from about 80 wt % to 100 wt % polymer particles having an average particle size from about 5 µm to about 150 µm. In another example, the fluorescence quenching iodide salt can be potassium iodide. In yet another example, the magenta rhodamine dye and the potassium iodide can be present in the coloring agent at a molar ratio from about 2:3 to about 1:5. In a further example, the multi-fluid kit can further include a core fusing agent separate from the low tint fusing agent. The core fusing agent can include a second liquid vehicle and a carbon black pigment electromagnetic radiation absorber.

In a further example, a method for three-dimensional printing is presented. The method can include iteratively applying individual build material layers of a polymeric powder bed material, and based on a three-dimensional object model, selectively jetting a low tint fusing agent onto the individual build material layers. The low tint fusing agent can include an electromagnetic radiation absorber in a first liquid vehicle that absorbs radiation energy and converts the radiation energy to heat. Furthermore, based on the three-dimensional object model, the method can include selectively jetting a coloring agent onto the individual build material layers, wherein the coloring agent includes a magenta rhodamine dye and a fluorescence quenching iodide salt in a second liquid vehicle, and wherein a molar ratio of the magenta rhodamine dye to the fluorescence quenching iodide salt ranges from about 1:1 to about 1:10. The method also includes exposing the powder bed to energy to selectively fuse the polymer particles in contact with the electromagnetic radiation absorber to form a fused polymer matrix at individual build material layers. In one example, the method can further include based on a three-dimensional object model, selectively jetting a core fusing agent onto individual build material layers at a location of a core of the three-dimensional object, wherein the core fusing agent includes a second liquid vehicle and a carbon black pigment electromagnetic radiation absorber.

It is noted that when discussing the multi-fluid kit for three-dimensional printing, the three-dimensional printing kit, and the method for three-dimensional printing of the present disclosure, these discussions can be considered applicable to other examples, whether or not they are explicitly discussed in the context of that example. Thus, for example, in discussing a magenta rhodamine dye related to the multi-fluid kit for three-dimensional printing, such disclosure is also relevant to and directly supported in context of a three-dimensional printing kit, the method for three-dimensional printing, and vice versa.

It is also understood that terms used herein will have the ordinary meaning in the relevant technical field unless specified otherwise. In some instances, there are terms defined more specifically throughout the specification or included at the end of the present specification, and thus, these terms have a meaning consistent with these more specific definitions.

Multi-Fluid Kits

In one example, a multi-fluid kit 100 for three-dimensional printing is shown by way of example in FIG. 1. The multi-fluid kit can include a low tint fusing agent 110 and a coloring agent 150. The low tint fusing agent can include an electromagnetic radiation absorber 120 and a first liquid vehicle 130. The electromagnetic radiation absorber can absorb radiation energy and can convert the radiation energy to heat. The coloring agent can include a magenta rhodamine dye 160, shown schematically by example, and a fluorescence quenching salt 170, shown schematically as an alkali metal iodide (Alk-M $^{+-}$I), in a second liquid vehicle 180. A molar ratio of the magenta rhodamine dye to the fluorescence quenching iodide salt can range from about 1:1 to about 1:10.

Low Tint Fusing Agents

During three-dimensional printing, a low tint fusing agent can be ejected as printable droplets into a layer of a polymeric powder bed material. An electromagnetic radiation absorber in the low tint fusing agent can be capable of absorbing radiation and converting the absorbed radiation to thermal energy, which in turn can partially or fully melt or coalesce the polymeric powder bed material in contact with the low tint fusing agent. The melting or coalescing can cause individual particles of the polymeric powder bed material to soften and to fuse, bind, cure, etc., to form a layer of the three-dimensional green part (or 3D green body object). By repeating this process in a layer-by-layer process, e.g., spreading a layer of polymeric powder build material and iteratively applying the low tint fusing agent thereon in a pattern corresponding with a layer of the three-dimensional article being built, the three-dimensional article can be formed.

The low tint fusing agent can include an electromagnetic radiation absorber. A low tint fusing agent can be selected for use, particularly at outer (visible) areas of the printed article, so that a coloring agent can be likewise applied to impart a color to the printed article. If black or dark fusing agent is also used, it may for example, be used within a core of the printed article that may not be visible when the printed article is completed.

As mentioned, the electromagnetic radiation absorber can absorb and convert electromagnetic energy to thermal energy. In one example, the electromagnetic radiation absorber can absorb radiation energy at a wavelength from about 800 nm to about 4,000 nm. As used herein, "absorb" means that 80% or more of the radiation having wavelengths from about 800 nm to about 4,000 nm is absorbed. When used with a light source that emits a wavelength in this range the electromagnetic radiation absorber can cause a polymeric powder bed material in contact therewith, to melt and coalesce without melting the polymeric powder bed material that is not in contact with the low tint fusing agent. In accordance with the "low tint" aspect of the low tint fusing agent, the electromagnetic radiation absorber can be transparent, pale in color, or white. For example, the electromagnetic radiation absorber may be transparent or white at wavelengths ranging from about 400 nm to about 780 nm. In some examples, the term "transparent" as used herein, indicates that about 20% or less of the radiation having wavelengths from about 400 nm to about 780 nm is absorbed. Thus, in examples herein, the low tint fusing agent can be white, colorless, or pale in coloration so that coloring agent can be effective in coloring the polymeric powder bed material without much, if any, interference in coloration from the radiation absorber. At the same time, the low tint fusing agent can generate heat when exposed to electromagnetic energy wavelengths from 800 nm to 4,000 nm sufficient to partially or fully melt or coalesce the polymeric powder bed material that is in contact with the low tint fusing agent.

In some examples, the electromagnetic radiation absorber of the low tint fusing agent can include an inorganic pigment. The inorganic pigment can include lanthanum hexaborides, tungsten bronzes, indium tin oxides, aluminum zinc oxides, ruthenium oxides, silver, gold, platinum, iron pyroxenes, iron phosphates, copper pyrophosphates, or a combination thereof. In an example, the electromagnetic radiation absorber can include a tungsten bronze. The tungsten bronze can be an alkali doped tungsten oxide. The alkali dopant can be included from greater than 0 mol % to about 0.33 mol % cesium, sodium, potassium, rubidium, or a combination thereof. In another example, the electromagnetic radiation absorber can include a modified iron phosphate having a formula $A_xFe_yPO_4$. In an example, the modified iron phosphate can include copper iron phosphate where A is Cu, magnesium iron phosphate where A is Mg, or zinc iron phosphate where A is Zn. In the copper iron phosphate, the magnesium iron phosphate, or the zinc iron phosphate x is 0.1 to 0.5 and y is 0.50 to 0.9. In a further example, the electromagnetic radiation absorber can be a modified copper phosphate having a formula $A_xCu_yP_2O_7$. The modified copper phosphate can include iron copper phosphate where A is Fe, magnesium copper phosphate where A is Mg, or zinc copper phosphate where A is Zn. In the iron copper phosphate, the magnesium copper phosphate, or the zinc copper phosphate x is 0 to 2 and y is 0 to 2.

The electromagnetic radiation absorber can be present in the low tint fusing agent at from about 1 wt % to about 20 wt %. In other examples, the electromagnetic radiation absorber can be present at from about 1 wt % to about 10 wt %, at from about 5 wt % to about 15 wt %, at from 10 wt % to about 20 wt %, or from about 2 wt % to about 12 wt %. Furthermore, the electromagnetic radiation absorber can have an average particle size that can range from about 1 nm to about 250 nm. The term "average particle size" describes a diameter or average diameter, which may vary, depending upon the morphology of the individual particle. In an example, the respective particle can have a substantially spherical morphology. A substantially spherical particle, e.g., spherical or near-spherical) has a sphericity of >0.84. Thus, any individual particles having a sphericity of <0.84 are considered non-spherical (irregularly shaped). The particle size of the substantially spherical particle may be provided by its diameter, and the particle size of a non-spherical particle may be provided by its average diameter, e.g., the average of multiple dimensions across the particle, or by an effective diameter, e.g. the diameter of a sphere with the same mass and density as the non-spherical particle. In yet other examples, the electromagnetic radiation absorber can have an average particle size from about 10 nm to about 200 nm, from about 5 nm to about 75 nm, from about 50 nm to about 150 nm, or from about 80 nm to about 160 nm.

The electromagnetic radiation absorber can provide boosting capacity sufficient to increase a temperature of a polymeric powder bed material above the melting or softening point of the polymeric powder bed material. As used herein, "temperature boosting capacity" refers to the ability of an electromagnetic radiation absorber to convert light energy into thermal energy to increase a temperature of polymeric powder bed material over and above the temperature of an unprinted portion of the polymeric powder bed material. For example, in many examples, the powder bed material is brought to a temperature that is relatively near the melting temperature of the polymeric powder bed material, and the electromagnetic absorber and corresponding electromagnetic energy is used to bring or nudge the material where the radiation absorber is present to a melting or coalescing temperature. Thus, the polymeric powder bed material can be fused together when the temperature increases to or above the melting or softening temperature of the polymer, but fusion can also occur in some instance below the melting point. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range, and an upper softening range. In the lower and middle softening ranges, the polymeric powder bed material particles can coalesce to form a part while the remaining polymer powder can remain loose. Thus, though in some instances the polymeric powder build material may become melted, in other instances, an outer region of the particles may become melted, the particles may become softened, the outer region of the particles may become softened, etc., provided whatever thermal modification that occurs, the particles become fused together and areas outside of where the low tint fusing agent is applied remain as a powder or powder-like material that can be separated from the printed article.

Although melting point and softening point are often described herein as the temperatures for coalescing the polymeric powder bed material, as mentioned, in some cases the particles of the polymeric powder bed material can coalesce at temperatures slightly below the melting point or softening point. Therefore, as used herein "melting point" and "softening point" can include temperatures slightly lower, such as up to about 5° C. lower than the actual melting point or softening point. For example, even with the expanded temperature processing window, there may be instances where some over-fusing in certain locations can be acceptable in order to achieve a high-density, e.g., 90%, 95%, 99%, etc., along a larger area of the part, so on average, the part density may still be increased.

In one example, the electromagnetic radiation absorber can have a temperature boosting capacity from about 5° C. to about 30° C. for a polymeric powder bed material with a melting or softening point from about 75° C. to about 350° C. If the polymeric powder bed material can be at a temperature within about 5° C. to about 30° C. of the melting or softening point, then the electromagnetic radiation absorber can boost the temperature of the printed polymeric powder bed material up to or above the melting or softening point of the polymeric powder bed material, while the unprinted polymeric powder bed material remains at a lower temperature. In some examples, the polymeric powder bed material can be preheated to a temperature ranging from about 4° C. to about 30° C. from about 10° C. to about 30° C. or from about 10° C. to about 20° C. lower than the melting or softening point of the polymeric powder bed material. The jettable fluid(s) can then be printed onto the polymeric powder bed material and irradiated with electromagnetic radiation sufficient to coalesce the printed portion of the polymeric powder bed material. Thus, the electromagnetic radiation absorber can provide a temperature boost to the polymeric powder bed material compared to unprinted areas of the polymeric powder bed material.

The low tint fusing agent can further include a liquid vehicle, which is referred to herein as a first liquid vehicle (relative to a second liquid vehicle that may be present in the coloring agent). The liquid vehicle components that can be used are described in greater detail after a description of the coloring agent herein.

Coloring Agents

A coloring agent can include a magenta rhodamine dye and a fluorescence quenching iodide salt in a second liquid vehicle. Magenta rhodamine dyes can provide good magenta color properties for mixing with other colors, such as cyan and yellow, to generate various primary and secondary colors, but can also fluoresce in certain types of lighting conditions, causing them to look inconsistent with varied lighting conditions. In accordance with the present disclosure, the fluorescence quenching iodide salt can be used to even out the appearance of the magenta rhodamine dye in varied lighting conditions.

The magenta rhodamine dye can include a rhodamine 6G, rhodamine B, rhodamine 123, rhodamine derivatives, or a combination thereof. Examples of rhodamine dyes that can be used include acid red 35 (AR-35), acid red 52 (AR-52), acid red 249 (AR-249), acid red 289 (AR-289), acid red 388 (AR-388), or the like. In some examples, the coloring agent can include a single colorant, namely a single magenta rhodamine dye, which in some instances, can provide for a more even coloration of a printed article throughout the various layers of the article. In some examples, the magenta rhodamine dye can be present in the coloring agent at from about 1 wt % to about 7 wt %. In yet other examples, the magenta rhodamine dye can be present at from about 1.5 wt % to about 6 wt %, at from about 2 wt % to about 4 wt %, at from about 1 wt % to about 3 wt %, or at from about 4 wt % to about 7 wt %.

The fluorescence quenching iodide salt can be, for example, selected from lithium iodide, potassium iodide, sodium iodide, or a combination thereof. In an example, the fluorescence quenching iodide salt can be potassium iodide. The fluorescence quenching iodide salt can physically or chemically interact with the magenta rhodamine dye to decrease the fluorescence intensity of the magenta rhodamine dye. Without being bound by any particular theory, the fluorescence quenching activity may be attributable to a heavy atom effect. The fluorescence quenching iodide salt has atomic size larger than some other halides which may offer greater quenching efficiency and deactivation of excited state molecules. In some examples, the fluorescence quenching iodide salt can be present in the coloring agent at from about 1 wt % to about 30 wt %. In yet other examples, the fluorescence quenching iodide salt can be present at from about 3 wt % to about 12 wt %, at from about 4 wt % to about 16 wt %, at from about 2 wt % to about 6 wt %, or at from about 10 wt % to about 25 wt %.

A molar ratio of the magenta rhodamine dye to the fluorescence quenching iodide salt in the coloring agent can range from about 1:1 to about 1:10. In yet other examples, a molar ratio of the magenta rhodamine dye to the fluorescence quenching iodide salt can range from 1:1 to about 1:5 or from about 2:3 to about 1:5. In some examples, the fluorescence quenching iodide salt can be present in the coloring agent at a molar ratio greater than a molar ratio of the magenta rhodamine dye.

The coloring agent can further include a liquid vehicle, which is referred to herein as a second liquid vehicle (relative to a first liquid vehicle that may be present in the low tint fusing agent). The liquid vehicle components that can be used are described in greater detail below.

Liquid Vehicles

The low tint fusing agent can include a first liquid vehicle, and the coloring agent can include a second liquid vehicle. As both liquid vehicles (and other liquid vehicles of other fluid agents that may be present) can include similar components, the liquid vehicles are described together. However, it is understood that the various liquid vehicles described herein can be independently formulated based on properties useful for printing of the specific fluid agent to which the liquid vehicle is formulated. Other fluid agents that may also utilize a liquid vehicle as described herein include other coloring agents (other than magenta coloring agent), detailing agents, other fusing agents (other than the low tint fusing agent), etc.

Liquid vehicles as described herein can include water; organic co-solvent; surfactant (non-ionic, cationic, and/or anionic); biocide, fungicides, or other antimicrobial; anti-kogation compounds; chelators; viscosity modifiers; etc.; or any combination thereof. In an example, a liquid vehicle can be an aqueous liquid vehicle. In an example, the aqueous liquid vehicle can include water alone as the solvent. In yet other examples, an aqueous liquid vehicle can include water at from about 30 wt % to about 99 wt % of fluid agent. In other examples, a liquid vehicle can include organic co-solvent(s) that can be included for various reasons, such as for jettability, jetting reliability, decap performance, viscosity modification, dispersing additives in a formulation, etc. Classes of co-solvents that can be used can include organic co-solvents including aliphatic alcohols, aromatic alcohols, diols, glycol ethers, polyglycol ethers, caprolactams, formamides, acetamides, and C3 to C150 alcohols. Examples of such compounds can include aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In an example, the co-solvent can be selected from 2-pyrollodine; 1-(2-hydroxyethyl)-2-pyrrolidone; 2-pyrrolidone; 1,5-pentandiol; triethylene glycol; tetraethylene glycol; 2-methyl-1,3-propanediol; 1,6-hexanediol; tripropylene glycol methyl ether; N-methylpyrrolidone; ethoxylated glycerol-1; or a combination thereof. To the extent these co-solvents act as a temperature reducing plasticizer for a specific polymeric powder bed material, some of these other co-solvents can be considered to be applicable in that context. When present, organic co-solvents can be present at greater than 0 wt % to about 80 wt % of the jettable fluid. In yet other examples, the organic co-solvent can be present at from about 10 wt % to about 40 wt % of the jettable fluid.

Non-ionic, cationic, and/or anionic surfactant can be present in a liquid vehicle. Examples can include acetylenic diols, nonionic floursurfactants, ethoxylated low-foam wetting agents, alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, or the like. Commercially available examples of surfactants can include, but are not limited to, TERGITOL® TMN-6, TERGITOL® 15S7, TERGITOL® 15S9, LEG-1, LEG-7; Triton™ X-100, Triton™ X-405, and CAPSTONE® fluorosurfactants all available from The Dow Chemical Company (USA); and SURFYNOL® SEF, SURFYNOL® 440, SURFYNOL® CT-111, SURFYNOL® 420, and SURFYNOL® 104E all available from Air Products and Chemicals, Inc. (USA). A total amount of surfactant added to a formulation of this disclosure may range from about 0.01 wt % to about 20 wt % or from about 0.01 wt % to about 5 wt % of the jettable fluid.

Biocides, fungicides, and other microbial agents can also be included in a liquid vehicle. Example antimicrobial agents can include the NUOSEPT® (Ashland Inc. (USA)), VANCIDE® (R.T. Vanderbilt Co. (USA)), ACTICIDE® B20 and ACTICIDE® M20 (Thor Chemicals (U.K.)), PROXEL® GXL (Arch Chemicals, Inc. (USA)), BAR- DAC® 2250, 2280, BARQUAT® 50-65B, and CARBOQUAT® 250-T, (Lonza Ltd. Corp. (Switzerland)), KORDEK® MLX (The Dow Chemical Company (USA)), and combinations thereof. In an example, a total amount of antimicrobial agents in the liquid vehicle can range from about 0.1 wt % to about 1 wt %, or from about 0.1 wt % to about 0.4 wt % with respect to the total wt % of the jettable fluid.

Anti-kogation agent can be present to minimize or prevent build-up of a formulation on a print head. When present, an anti-kogation agent can include oleth-3-phosphate, polyacrylic acid polymer, or a combination thereof. Commercially available examples can include CRODAFOS™ O3A, CRODAFOS™ N-3, all available from Croda Inc. (USA), and CARBOSPERSE™ K-7028 available from The Lubrizol Corporation (USA). A total amount of an anti-kogation agent in a liquid vehicle can range from about 0.1 wt % to about 3 wt %, from about 0.1 wt % to about 0.2 wt %, or at from about 0.2 wt % to about 0.6 wt % based on a total wt % of the jettable fluid.

Core Fusing Agents

In some example, the multi-fluid kit, the three-dimensional printing kits, or methods describe herein can include a second fusing agent, such as a core fusing agent. A core fusing agent can also include liquid vehicle (which may be referred to as a tertiary liquid vehicle), as well as a carbon black electromagnetic radiation absorber or some other radiation absorber that may not be suitable for use with a coloring agent, e.g., too dark to effectively color using a coloring agent. The carbon black electromagnetic radiation absorber, for example, can be present in the core fusing agent at from about 3 wt % to about 10 wt %. In other examples, the carbon black electromagnetic radiation absorber can be present at from about 3 wt % to about 8 wt %, at from about 5 wt % to about 10 wt %, or at from about 4 wt % to about 6 wt %. The carbon black electromagnetic radiation absorber can have an average particle size from about 2 nm to about 50 nm. In some examples, the carbon black electromagnetic radiation absorber can be dispersed in its liquid vehicle by a polymeric dispersant. The tertiary liquid vehicle can be as described above, with respect to the liquid vehicles used in formulating the low tint fusing agent and/or the coloring agent.

Detailing Agent

In some example, the multi-fluid kit, the three-dimensional printing kits, or methods describe herein can include a detailing, which includes a detailing compound and liquid vehicle (which may be referred to as a fourth liquid vehicle). However, in some instances, the detailing compound is the liquid vehicle, e.g., if the detailing compound is water, then the detailing agent may be water, or may be a liquid vehicle that includes water as the detailing compound, for example. The detailing compound can be capable of reducing the temperature of the polymeric powder bed material onto which the detailing agent can be applied. In some examples, the detailing agent can be printed around the edges of the portion of the polymeric powder bed material that is printed with the low tint fusing agent. The detailing agent can increase selectivity between the fused and unfused portions of the polymeric powder bed material by reducing the temperature of the powder around the edges of the portion to be fused.

As mentioned, the detailing compound can be water and/or an organic co-solvent that evaporates at the temperature of the polymeric powder bed material. The detailing compound may be formulated into a liquid vehicle or may be a single liquid. In some examples, a polymeric powder bed material can be preheated to a preheat temperature within about 10° C. to about 70° C. of the fusing temperature of the polymeric powder bed material. The detailing compound can be a solvent that evaporates after contacting the polymeric powder bed material at the preheat temperature, thereby cooling the printed portion of the polymeric powder bed material through evaporative cooling.

In further detail, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In other examples, the detailing agent can be mostly water. In a particular example, the detailing agent can be from about 85 wt % to 100 wt %, or from about 85 wt % to about 99 wt % water. In further examples, the detailing agent can be from about 95 wt % to 100 wt %, or from about 95 wt % to 99 wt % water.

The detailing agent can also include ingredients to allow the detailing agent to be jetted by a fluid jet printhead. In some examples, the detailing agent can include jettability imparting. These ingredients can include a liquid vehicle, surfactant, dispersant, co-solvent, biocides, viscosity modifiers, materials for pH adjustment, sequestering agents, preservatives, and so on. These ingredients can be included as described above and in any of the amounts described above in the liquid vehicle section.

In still further examples, the detailing agent can be substantially devoid of radiation absorbers. That is, in some examples, the detailing agent can be substantially devoid of ingredients that absorb electromagnetic radiation energy. In certain examples, the detailing agent can include colorants such as dyes or pigments, but in small enough amounts that the colorants do not cause the polymeric powder bed material printed therewith to fuse when exposed to the electromagnetic radiation energy.

Three-Dimensional Printing Kits

Figure 2:
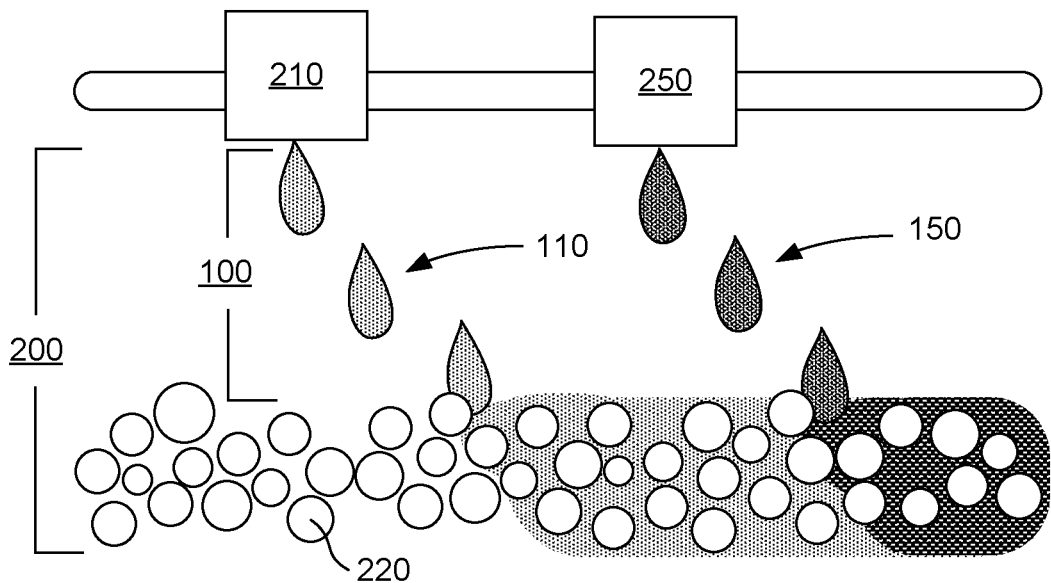
FIG. 2 schematically illustrates an example three-dimensional printing kit in use in accordance with the present disclosure.

A three-dimensional printing kit 200 is shown by Example in FIG. 2, which can include a polymeric powder bed material 220 and a multi-fluid kit 100. The multi-fluid kit can include a low tint fusing agent 110 and a coloring agent 150. The low tint fusing agent can an electromagnetic radiation absorber in a first liquid vehicle. The low tint fusing agent and the coloring agent can be applied to the polymeric powder bed material in a layer-by-layer manner, accruing layers until a three dimensional part is formed. Application can be carried out, for example, using digital printing technology, with the fusing agent being applied by a fusing agent ejector 210 and the coloring agent being applied using a coloring agent ejector 250. Ejectors can be provided by thermal printheads, piezo printheads, or the like. The electromagnetic radiation absorber can absorb radiation energy and can convert the radiation energy to heat. The coloring agent can include a magenta rhodamine dye and a fluorescence quenching iodide salt in a second liquid vehicle. A molar ratio of the magenta rhodamine dye to the fluorescence quenching iodide salt can range from about 1:1 to about 1:10. In an example, the polymeric powder bed material can include from about 80 wt % to 100 wt % polymer particles having an average particle size from about 5 μm to about 150 μm. In another example, the fluorescence quenching iodide salt can be potassium iodide.

In yet another example, the magenta rhodamine dye and the potassium iodide can be present in the coloring agent at a molar ratio from about 2:3 to about 1:5. In a further example, the multi-fluid kit can further include a core fusing agent separate from the low tint fusing agent. The core fusing agent can include a second liquid vehicle and a carbon black pigment electromagnetic radiation absorber.

Polymeric Powder Bed Material

The polymeric powder bed material can include from about 60 wt % to 100 wt % polymer particles. The polymer particles can have an average particle size that can range from about 5 μm to about 150 μm, in one example. In yet other examples, the average particle size can range from about 50 μm to about 125 μm, or from about 25 μm to about 100 μm.

The polymeric powder bed material can include semi-crystalline thermoplastic materials with a relatively wide temperature differential between the melting point and re-crystallization, e.g., greater than 5° C. Some specific examples of the polymeric powder bed materials can include polyamides (PAs or nylons), such as polyamide-6 (PA6), polyamide-9 (PA9), polyamide-11 (PA11), polyamide-12 (PA12), polyamide-66 (PA66), polyamide-612 (PA612), and other polyamides. Other specific examples of polymeric powder bed materials can include polyethylene, polyethylene terephthalate (PET), polystyrene, polyacrylate, polyacetal, polypropylene, polycarbonate, polyester, thermoplastic polyurethane, polyether ketone, polybutylene terephthalate, and blends of any of the multiple polymers listed herein, as well as mixtures thereof. Core shell polymer particles of these materials may also be used. In some examples, the polymeric powder bed material can exclude amorphous materials.

The polymeric powder bed material can have a melting point that can range from about 75° C. to about 350° C., from about 100° C. to about 300° C., or from about 150° C. to about 250° C. As examples, the polymeric powder bed material can be a polyamide having a melting point of about 170° C. to about 190° C., or a thermoplastic polyurethane that can have a melting point ranging from about 100° C. to about 165° C. A variety of thermoplastic polymers with melting points or softening points in these ranges can be used. In a specific example, the polymeric powder bed material can be polyamide-12, which can have a melting point from about 175° C. to about 200° C.

The polymeric powder bed material can include, in some examples, in addition to the polymer particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), all available from Clariant Int. Ltd. (USA). In an example, the charging agent can be added in an amount ranging from greater than 0 wt % to about 5 wt % based upon the total wt % of the polymeric powder bed material.

Flow aid(s) can be added to increase the coating flowability of the polymeric powder bed material. Flow aid(s) may be particularly desirable when the particles of the polymeric powder bed material are on the smaller end of the particle size range. A flow aid can increase the flowability of the polymeric powder bed material by reducing friction, lateral drag, and tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid can be added in an amount ranging from greater than 0 wt % to less than about 5 wt % based upon the total wt % of the polymeric powder bed material.

Methods of Three-Dimensional Printing

Figure 3:
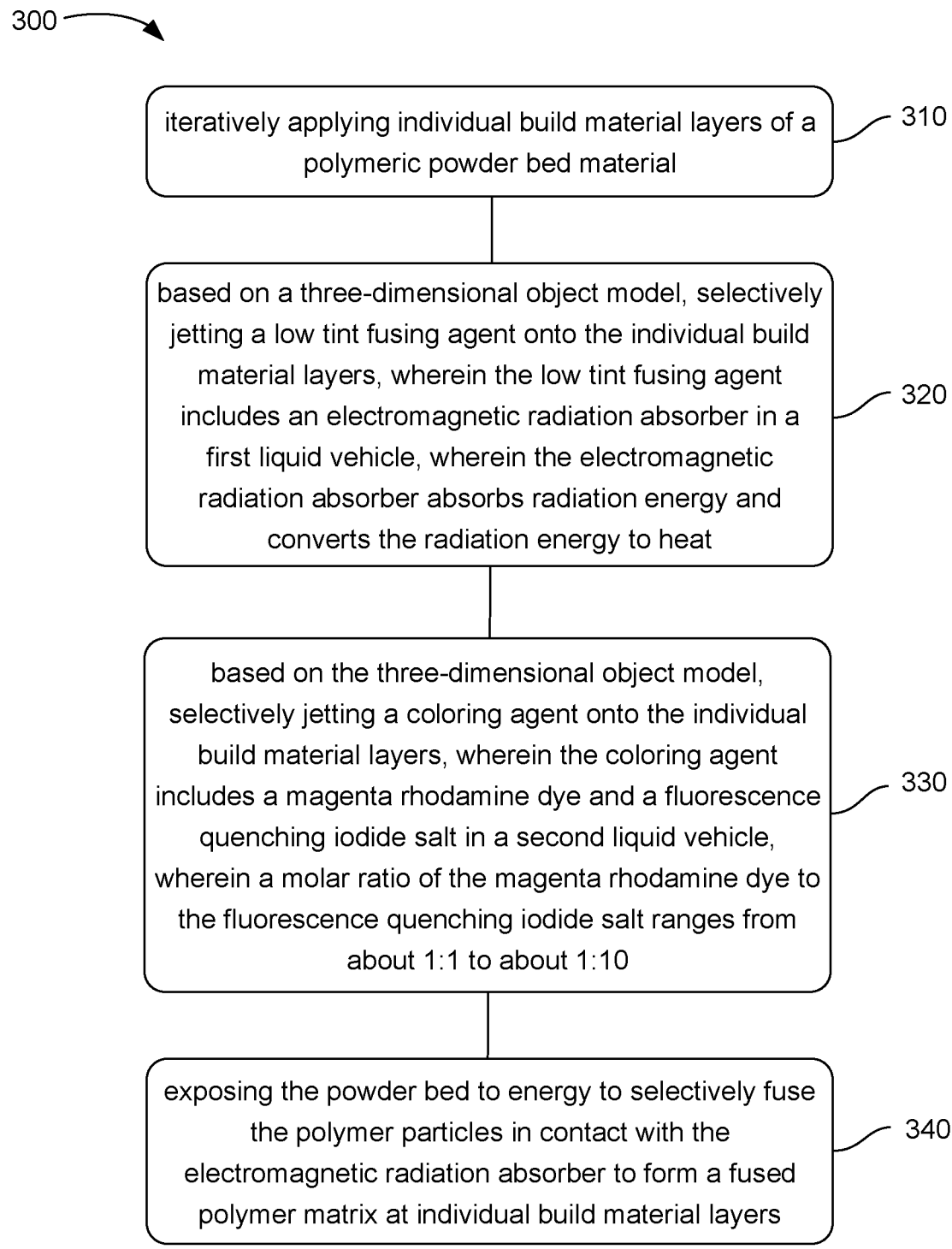
FIG. 3 schematically illustrates an example method of three-dimensional printing in accordance with the present disclosure.

Further presented herein is a method 300 for three-dimensional printing, as shown in FIG. 3. The method can include, iteratively 310 applying individual build material layers of a polymeric powder bed material, and based on a three-dimensional object model, selectively 320 jetting a low tint fusing agent onto the individual build material layers. The low tint fusing agent can include an electromagnetic radiation absorber in a first liquid vehicle, wherein the electromagnetic radiation absorber absorbs radiation energy and converts the radiation energy to heat. In further detail, based on the three-dimensional object model, the method can further include selectively 330 jetting a coloring agent onto the individual build material layers, wherein the coloring agent includes a magenta rhodamine dye and a fluorescence quenching iodide salt in a second liquid vehicle, wherein a molar ratio of the magenta rhodamine dye to the fluorescence quenching iodide salt ranges from about 1:1 to about 1:5. The method can also include exposing 340 the powder bed to energy to selectively fuse the polymer particles in contact with the electromagnetic radiation absorber to form a fused polymer matrix at individual build material layers. The polymeric powder bed material, the low tint fusing agent, and the coloring agent can be as described above. The selective jetting can occur using a fluid ejector. The fluid ejector can be any type of printing apparatus capable of selectively applying the jettable fluid(s). For example, the fluid ejector(s) can be an inkjet applicator (thermal, piezo, etc.), a sprayer, etc.

The low tint fusing agent and the coloring agent can be printed on the same portions of the polymeric powder bed material and/or can be printed on different portions of the polymeric powder bed material. For example, the selectively jetting can include, based on the three-dimensional object model, selectively jetting a low tint fusing agent to a first portion of the polymeric powder bed material, but not to a second portion of the polymeric powder bed material; and based on the three-dimensional object model, selectively jetting the coloring agent formulation to the first portion of the polymeric powder bed material and not the second portion of the polymeric powder bed material. Thereby permitting the first portion of a three-dimensional printed article formed therefrom to be magenta and leaving the second portion of the polymeric powder bed material unaffected by the low tint fusing agent and the coloring agent. In yet another example, the selectively jetting can include, based on the three-dimensional object model, selectively jetting a low tint fusing agent to a first portion of the polymeric powder bed material and a second portion of the polymeric powder bed material, but not to a third portion of the polymeric powder bed material; and based on the three-dimensional object model, selectively jetting the coloring agent formulation to the first portion of the polymeric powder bed material and not the second and third portions of the polymeric powder bed material. Thereby permitting the first portion of the three-dimensional printed article formed therefrom to be magenta, while the second portion of the printed article can be white or slightly colored, and/or can be colored by jetting a second coloring agent at the second portion of the printed article.

In some examples, the method can further include based on a three-dimensional object model, selectively jetting a core fusing agent onto individual build material layers at a location of a core of the three-dimensional object. The core fusing agent can include a second liquid vehicle and a carbon black pigment electromagnetic radiation absorber. The carbon black pigment electromagnetic radiation absorber can provide a boosting capacity sufficient to increase the temperature of a polymeric powder bed material above the melting or softening point of the polymeric powder bed material and can also radiate heat thereby further boosting the temperature in the area adjacent to the core fusing agent. The carbon black pigment electromagnetic radiation absorber can impart a black color to a core of the printed article.

In other examples, the method can further include, based on the three-dimensional object model, selectively jetting a detailing agent onto individual layers laterally at a border between the polymeric powder bed material contacted by the electromagnetic radiation absorber and an area of the polymeric powder bed material un-contacted by the electromagnetic radiation absorber. Printing a detailing agent laterally at a border can increase the definition of the three-dimensional object at the lateral edge and can permit a formation of a smooth edge at the printed three-dimensional article.

Following jetting of the fluid agents (low tint fusing agent, coloring agent, core fusing agent, and/or detailing agent), an electromagnetic radiation source can be used to provide pulsed or non-pulsed electromagnetic energy sufficiently intense and wavelength coordinated to generate heat at the polymeric powder bed material and the jetted fluid agents. The electromagnetic radiation source can be a static lamp or can travel latterly by carriage along with the fluid ejectors. In one example, the electromagnetic radiation source can be an infrared (IR) or near-infrared light source, such as IR or near-IR curing lamps, IR or near-IR light emitting diodes (LED), or lasers with the desirable IR or near-IR electromagnetic wavelengths. In another example, the electromagnetic radiation source can include a scanning lamp energy source with a single or multiple high watt bulbs. Non-limiting bulb examples can have a wattage that can range from about 800 watts to about 2,000 watts. In some examples, exposing the particulate powder bed material to the electromagnetic energy can raise a temperature of an individual layer of the polymeric powder bed material to a temperature ranging from about 1° C. to about 100° C. above a melting temperature of the polymeric powder bed material. A portion of the polymeric powder bed material having the electromagnetic radiation absorber applied thereto can thus be fused, while areas outside of where the jettable fluid(s) were applied can remain free flowing or substantially free flowing (e.g., they do not become part of the three-dimensional object or part being fabricated).

Definitions

It is noted that, as used in this specification and the appended claims, the singular forms "a," "an," and "the" include plural referents unless the context clearly dictates otherwise.

As used herein, "liquid vehicle" refers to water and in some examples, other components, such as, surfactants, solvents, co-solvents, anti-kogation agents, buffers, biocides, sequestering agents, viscosity modifiers, surface-active agents, and the like.

As used herein, "jetting" or "jettable" refers to compositions that are ejectable from jetting architecture, such as ink-jet architecture. Ink-jet architecture can include thermal or piezo pens with printing orifices or openings suitable for ejection of small droplets of fluid. In a few examples, the fluid droplet size can be less than 10 picoliters, less than 20 picoliters, less than 30 picoliters, less than 40 picoliters, less than 50 picoliters, etc.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, a plurality of items, structural elements, compositional elements, and/or materials may be presented in a common list for convenience. However, these lists should be construed as though members of the list is individually identified as a separate and unique member. Thus, no individual member of such list should be construed as a de facto equivalent of any other member of the same list solely based on presentation in a common group without indications to the contrary.

Concentrations, amounts, and other numerical data may be expressed or presented herein in a range format. A range format is used merely for convenience and brevity and thus should be interpreted flexibly to include not only the numerical values explicitly recited as the limits of the range, but also to include individual numerical values or sub-ranges encompassed within that range as if numerical values and sub-ranges are explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Coloring Agents to Evaluate Thermal Inkjet Printability To evaluate the effect of including iodide salt on magenta rhodamine dye-containing formulations with respect to printability performance from thermal inkjet architecture, a series of coloring agent formulations were prepared by admixing the ingredients in Tables 1A and 1B below.

TABLE 1A

Coloring Agent Formulations

| Ingredient | M0 (Comparative) | M1 | M2 |
|---|---|---|---|
| | Approx. Weight Percentage | | |
| Organic Vehicle Components Including Organic Co-solvents | 45 | 45 | 45 |
| AR-52 (Magenta Rhodamine Dye) | 2 | 2 | 2 |
| Potassium Iodide (Fluorescence Quenching Iodide Salt) | — | 0.5 | 2 |
| Water | Balance | Balance | Balance |

TABLE 1B

Coloring Agent Formulations

| Ingredient | M3 | M4 |
|---|---|---|
| | Approx. Weight Percentage | |
| Organic Vehicle Components Including Organic Co-solvents | 45 | 45 |
| AR-52 (Magenta Rhodamine Dye) | 2 | 2 |
| Potassium Iodide (Fluorescence Quenching Iodide Salt) | 4 | 8 |
| Water | Balance | Balance |

Comparative coloring agent M0 and coloring agents M1-M4 were printed on a print medium using a 2D home printer available from HP, Inc. (USA) to evaluate printability performance of the various coloring agents. The patterns printed included a series of lines and blocks to evaluate printability of coloring agents with varying concentrations of potassium iodide (M1-M4) against a comparative formulation without potassium iodide (Comparative M0). The prints exhibited negligible changes in printability for coloring agent formulations M1-M4 when compared to the comparative coloring agent formulation M0. Therefore, it was confirmed that potassium iodide can be included in molar excess relative to the magenta rhodamine dye without compromising acceptable printability performance.

Example 2—Printing of Three-Dimensional Printed Objects to Evaluate Color Properties To evaluate the fluorescing and other coloration issues of three-dimensional printed objects, and more specifically to compare the inclusion of an iodide salt in a magenta rhodamine dye-containing formulation to formulations without the iodide salt, a series of three-dimensional objects were printed. A three-dimensional printer that prints polymeric three-dimensional objects was used to print a low tint fusing agent into a powder bed material of polyamide-12 (PA12) along with one of three coloring agents. The printed articles were in the form of cube-shaped blocks having a dimension of 1 cm×1 cm×1 cm. The low tint fusing agent used is shown in Table 2 and the three coloring agents (two of which were comparative coloring agents) are shown in Table 3, as follows:

TABLE 2

Low Tint Fusing Agent

| Ingredient | Approx. Weight Percentage |
|---|---|
| Organic Vehicle Components Including Organic Co-solvents | 62 |
| Tungsten Bronze-based (Electromagnetic Radiation Absorber) | 8 |
| Water | Balance |

TABLE 3

Coloring Agents

| Ingredient | M0 (Comparative) | M0$_2$ (Comparative) | M3 |
|---|---|---|---|
| | Approx. Weight Percentage | | |
| Organic Vehicle Components Including Organic Co-solvents | 45 | 45 | 45 |
| AR-52 (Magenta Rhodamine Dye) | 2 | 2 | 2 |
| HMI Dye (Sulfonated Ionic Dye) | — | 2 | — |
| Potassium Iodide (Fluorescence Quenching Iodide Salt) | — | — | 4 |
| Water | Balance | Balance | Balance |

HMI Dye in Comparative Example M0$_2$ is available from Nippon Kayaku (Japan).

Three printed blocks were prepared using polyamide-12 (PA12) as the polymeric powder build material, the fusing agent of Table 2, and one of the respective three magenta coloring agents prepared in accordance with Table 3 (M0 was a single magenta dye comparative coloring agent without an iodide salt, M0$_2$ was a multiple magenta dye comparative coloring agent without an iodide salt, and M3 included a single magenta dye (AR52) and a molar excess of potassium iodide salt as the fluorescence quenching iodide salt). The blocks (or objects) were printed in a layer-by-layer, with individual printed layers similar to that shown by example in FIG. 2, where the individual layers are additively accrued on top of one another to form the blocks. The coloring agent was printed at a surface of the blocks to a depth of about 100 μm to 500 μm from the surface, and a color density at the surface of about Contone 192 (about 2-3 times that of the fusing agent, M0 and M3 included 0.75 wt % AR52, and M0$_2$ included 1.5 wt % at a 1:1 weight ratio of AR52 and HMI). It is noted that fusing agent with a carbon black fusing compound was used in the core or inner portions of the blocks at locations that would not be visible on the printed block.

After printing, the printed blocks were allowed to cool and were visually inspected for fluorescence in ambient light as well as under UV light to check for fluorescence excitation under multiple lighting conditions. Under ambient light, the magenta color of the blocks varied in intensity and hue. The block printed using comparative coloring agent M0 appeared to have a red/violet coloring. The block printed using comparative coloring agent M0$_2$ had a fuchsia/magenta coloring. The block printed using coloring agent M3 had a purple/magenta coloring.

The blocks were then inspected under a UV light. The block printed using comparative coloring agent M0 exhibited the strongest florescence emission. The block printed using comparative coloring agent M0$_2$ exhibited less fluorescence compared to the other comparative coloring agent M0. This may have been due to the alternative and additional coloration and/or some quenching provided by the second dye. The block printed using coloring agent M3 exhibited the greatest amount of fluorescence quenching with minimal fluorescence emissions. By combining the magenta rhodamine dye with a fluorescence quenching iodide salt, particularly at a molar excess of the iodide salt relative to the magenta rhodamine dye, unwanted fluorescence emissions can be ameliorated, and the coloration of the printed object may likewise appear to have a more even coloration across many different lighting conditions.

Furthermore, in accordance with examples of the present disclosure, by using a single dye and a fluorescence quenching iodide salt as is used in the coloring agents M1-M4 from Tables 1A and 1B, the possibility of a introducing a differential of dye migration between two different dyes where heat is introduced can be eliminated. The use of a single magenta dye in one example of the present disclosure can often reduce the chance that the coloration at a bottom portion of the three-dimensional printed part (where there is be more dwell time in the powder bed) may be different than at a top portion of the three-dimensional part (where there may be increasing heat in the powder bed from layer to layer due to the additive application of heat that may occur over time as layers get built up). The combination of a single rhodamine magenta dye with an iodide salt as a fluorescence quencher appears to provide better fluorescence quenching than occurred using two dyes, and often may have the added benefit of avoiding or ameliorating intra-part coloration differentials.

What is claimed is:

1. A multi-fluid kit for three-dimensional printing, comprising:
   a low tint fusing agent including an electromagnetic radiation absorber in a liquid vehicle, wherein the electromagnetic radiation absorber absorbs radiation energy and converts the radiation energy to heat; and
   a coloring agent consisting of:
      from about 2 wt % to about 4 wt % of a magenta rhodamine dye;
      from about 4 wt % to about 16 wt % of a fluorescence quenching iodide salt, wherein the fluorescence quenching iodide salt is included in molar excess relative to the magenta rhodamine dye;
      an organic co-solvent; and
      a balance of water.

2. The multi-fluid kit of claim 1, wherein the electromagnetic radiation absorber absorbs the radiation energy at a wavelength from about 800 nm to about 4,000 nm, and wherein the electromagnetic radiation absorber is transparent or white at wavelengths ranging from about 400 nm to about 780 nm.

3. The multi-fluid kit of claim 1, wherein the electromagnetic radiation absorber includes an inorganic pigment selected from the group consisting of lanthanum hexaborides, tungsten bronzes, indium tin oxides, aluminum zinc oxides, ruthenium oxides, silver, gold, platinum, iron pyroxenes, iron phosphates, copper pyrophosphates, and a combination thereof.

4. The multi-fluid kit of claim 1, wherein the fluorescence quenching iodide salt is selected from the group consisting of lithium iodide, potassium iodide, sodium iodide, and a combination thereof.

5. The multi-fluid kit of claim 1, wherein a molar ratio of the magenta rhodamine dye to the fluorescence quenching iodide salt in the coloring agent ranges from about 2:3 to about 1:5.

6. The multi-fluid kit of claim 1, further comprising a core fusing agent separate from the low tint fusing agent, the core fusing agent including a liquid vehicle and a carbon black pigment electromagnetic radiation absorber.

7. The multi-fluid kit of claim 1, further comprising a detailing agent including a detailing compound.

8. A three-dimensional printing kit, comprising:
   a polymeric powder bed material; and
   a multi-fluid kit including:
      a low tint fusing agent including an electromagnetic radiation absorber in a liquid vehicle, wherein the electromagnetic radiation absorber absorbs radiation energy and converts the radiation energy to heat; and
      a coloring agent consisting of:
         from about 2 wt % to about 4 wt % of a magenta rhodamine dye;
         from about 4 wt % to about 16 wt % of a fluorescence quenching iodide salt, wherein the fluorescence quenching iodide salt is included in molar excess relative to the magenta rhodamine dye;
         an organic co-solvent; and
         a balance of water.

9. The three-dimensional printing kit of claim 8, wherein the polymeric powder bed material includes from about 80 wt % to 100 wt % of polymer particles having an average particle size ranging from about 5 µm to about 150 µm.

10. The three-dimensional printing kit of claim 8, wherein the fluorescence quenching iodide salt is potassium iodide.

11. The three-dimensional printing kit of claim 10, wherein the magenta rhodamine dye and the potassium iodide are present in the coloring agent at a molar ratio ranging from about 2:3 to about 1:5.

12. The three-dimensional printing kit of claim 8, wherein the multi-fluid kit further comprises a core fusing agent separate from the low tint fusing agent, the core fusing agent including a liquid vehicle and a carbon black pigment electromagnetic radiation absorber.

13. A method for three-dimensional printing, the method comprising:
   iteratively applying individual build material layers of a polymeric powder bed material;
   based on a three-dimensional object model, selectively jetting a low tint fusing agent onto the individual build material layers, wherein the low tint fusing agent includes an electromagnetic radiation absorber in a liquid vehicle, wherein the electromagnetic radiation absorber absorbs radiation energy and converts the radiation energy to heat;
   based on the three-dimensional object model, selectively jetting a coloring agent onto the individual build material layers, wherein the coloring agent consists of:
      from about 2 wt % to about 4 wt % of a magenta rhodamine dye;
      from about 4 wt % to about 16 wt % of a fluorescence quenching iodide salt in a second liquid vehicle, wherein the fluorescence quenching iodide salt is included in molar excess relative to the magenta rhodamine dye;
      an organic-co-solvent; and
      a balance of water; and
   exposing the powder bed to energy to selectively fuse the polymer particles in contact with the electromagnetic radiation absorber to form a fused polymer matrix at individual build material layers.

14. The method of claim 13, further comprising based on a three-dimensional object model, selectively jetting a core fusing agent onto individual build material layers at a location of a core of the three-dimensional object, wherein the core fusing agent includes a liquid vehicle and a carbon black pigment electromagnetic radiation absorber.

* * * * *